(12) United States Patent
Ellison et al.

(10) Patent No.: US 7,338,075 B2
(45) Date of Patent: Mar. 4, 2008

(54) KNEE BOLSTER

(75) Inventors: Patrick Joseph Ellison, Dublin, OH (US); Ryan Miller, Columbus, OH (US); Bradley W. Klein, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/487,243

(22) Filed: Jul. 14, 2006

(65) Prior Publication Data
US 2008/0012279 A1 Jan. 17, 2008

(51) Int. Cl.
*B60R 21/045* (2006.01)
(52) U.S. Cl. .................................................. 280/752
(58) Field of Classification Search ............... 280/748, 280/750, 751, 752; 296/187.05, 193.02
See application file for complete search history.

(56) References Cited

U.S. PATENT DOCUMENTS

| | | | |
|---|---|---|---|
| 3,930,665 A * | 1/1976 | Ikawa ......................... 280/751 |
| 4,709,943 A | 12/1987 | Yoshimura et al. |
| 4,893,834 A | 1/1990 | Honda et al. |
| 5,037,130 A * | 8/1991 | Okuyama ................... 280/752 |
| 5,201,544 A | 4/1993 | Matano et al. |
| 5,273,314 A * | 12/1993 | Sakakibara ................. 280/752 |
| 5,370,417 A | 12/1994 | Kelman et al. |
| 5,549,327 A | 8/1996 | Rüsche et al. |
| 5,593,182 A * | 1/1997 | Frost ......................... 280/751 |
| 5,632,507 A | 5/1997 | Sinner et al. |
| 5,720,510 A * | 2/1998 | Daniel et al. ........... 296/187.05 |
| 5,865,468 A * | 2/1999 | Hur ............................ 280/752 |
| 6,086,098 A * | 7/2000 | Reiter et al. ................ 280/752 |
| 6,170,872 B1 | 1/2001 | Bair et al. |
| 6,199,942 B1 | 3/2001 | Carroll, III et al. |
| 6,302,437 B1 * | 10/2001 | Marriott et al. ............. 280/732 |
| 6,609,727 B2 | 8/2003 | Figlioli et al. |
| 6,866,294 B2 * | 3/2005 | Horsch et al. .............. 280/752 |
| 7,210,704 B2 * | 5/2007 | Ko ............................. 280/748 |
| 2003/0057692 A1 | 3/2003 | Horsch et al. |
| 2003/0057760 A1 | 3/2003 | Horsch |
| 2003/0184070 A1 | 10/2003 | Vidal et al. |
| 2004/0056463 A1 | 3/2004 | Marks et al. |
| 2004/0124623 A1 | 7/2004 | Yamazaki |
| 2005/0194773 A1 * | 9/2005 | Yamada et al. ............. 280/752 |
| 2006/0131861 A1 * | 6/2006 | Mani .......................... 280/752 |

FOREIGN PATENT DOCUMENTS

JP 63-315347 12/1988

* cited by examiner

*Primary Examiner*—Eric Culbreth
*Assistant Examiner*—Joseph Rocca
(74) *Attorney, Agent, or Firm*—Fay Sharpe LLP

(57) ABSTRACT

A knee bolster includes a curved bracket mounted to an associated cross beam of the vehicle. A knee panel member is mounted to the curved bracket at a location spaced from the associated cross beam. The panel member includes a laterally extending wall spaced from the curved bracket and support legs extending between the laterally extending wall and the curved bracket.

24 Claims, 4 Drawing Sheets

KNEE BOLSTER

BACKGROUND

The present invention relates, in general, to knee bolsters used in vehicles to protect the knees of vehicle occupants, such as during the event of a collision or crash. More particularly, the invention relates to an improved knee bolster that is easier to manufacture and assemble and/or provides an improved stepped crush (i.e., controlled deflection) when forcibly impacted. In one embodiment, the improved knee bolster employs varied thicknesses and/or dimensions to provide a two-step deflection versus force curve, i.e., a particular stepped crush, when a force is applied to the knee bolster, such as a knee impacting the knee bolster during a collision. The improved knee bolster will be described with particular reference to this and like embodiments, but it is to be appreciated that the knee bolster is also amenable to other like applications.

It is well known to use a knee bolster on or adjacent a vehicle's front dashboard, such as on either side of the vehicle's steering column extending from the front dashboard. Examples of such an arrangement are provided in U.S. Pat. Nos. 5,037,130 to Okuyama and 5,370,417 to Kelman et al., both expressly incorporated herein by reference. Another knee bolster example is disclosed in commonly-owned, U.S. Pat. No. 4,893,834, also expressly incorporated herein by reference.

It is known to attempt to control the crush (i.e., deflection relative to impact force) of a knee bolster. Various types of knee bolsters have been proposed for this purpose. Examples of such knee bolsters are disclosed in U.S. Pat. Nos. 5,273,314 to Sakakibara; 5,549,327 to Rüsche et al.; and 6,609,727 to Figlioli et al., all expressly incorporated herein by reference. The '314 and '727 patents disclose step-shaped knee bolsters, whereas the '327 patent discloses a knee bolster having a wall with a progressively dimensioned thickness, to control the rate of crush.

Prior art knee bolster, however, are often overly complex requiring complicated and/or costly processes for making the components which ultimately form the knee bolster. In addition, prior art knee bolsters often require difficult assembly procedures for assembly and/or installation into a vehicle. Still further, prior art knee bolsters are often difficult to modify for purposes of adjusting responsiveness to impact loads applied thereagainst.

SUMMARY

In accordance with one aspect, an improved knee bolster is provided for mounting within a vehicle. More particularly, in accordance with this aspect, the improved knee bolster includes a curved bracket mounted to an associated cross beam of the vehicle. A knee panel member is mounted to the curved bracket at a location spaced from the associated cross beam. The panel member includes a laterally extending wall spaced from the curved bracket and support legs extending between the laterally extending wall and the curved bracket.

In accordance with another aspect, another improved vehicle knee bolster is provided. More particularly, in accordance with this aspect, the knee bolster includes a cross member extending laterally along a vehicle. A knee panel is mounted to the cross member and positioned to be spaced apart from and opposed to one or both knees of a vehicle occupant. A bracket mounts the knee panel to the cross member in spaced relation thereto. The knee panel deflects a first amount upon application of an impact force prior to the bracket deflecting.

In accordance with still another aspect, a vehicle knee bolster having stepped deflection versus force curve is provided. More particularly, in accordance with this aspect, the knee bolster includes a curved bracket mounted to an associated cross beam of a vehicle. A knee panel member is mounted to an end of the curved bracket opposite the associated cross beam. The end has at least one mounting deck to which legs of the knee panel member are secured for supporting a laterally extending wall at a spaced location from the at least one mounting deck. The at least one mounting deck, the legs and the laterally extending wall together form a hollow frame section for deflecting a first amount of displacement upon receipt of an increasing impact load. The curved bracket deflects a second amount of displacement when the impact load is in excess of a predetermined amount.

DETAILED DESCRIPTION

Figure 1:
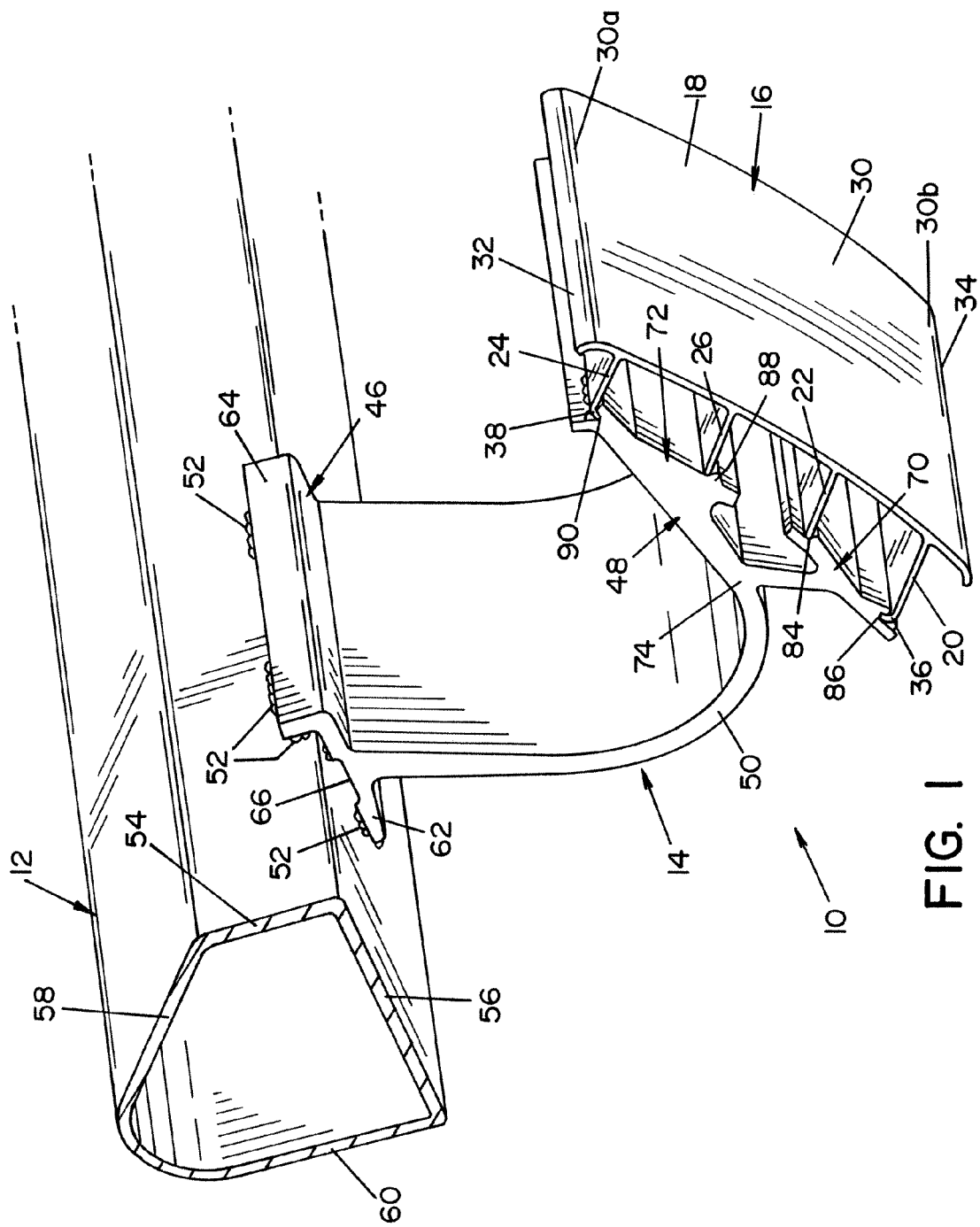
FIG. 1 is a perspective view of a knee bolster mounted to a cross beam of a vehicle.

Referring now to the drawings wherein the showings are for purposes of illustrating one or more exemplary embodiments, a knee bolster for mounting within a vehicle is depicted in FIG. 1 and generally indicated by reference numeral 10. As is known and understood by those skilled in the art, the knee bolster 10 is secured to a cross beam or member of a vehicle and oriented such that the knee bolster can extend toward a passenger compartment of the vehicle so as to protect a vehicle occupant's knee or knees in the event that the occupant's knee or knees are forcibly moved into the area of the vehicle occupied by the knee bolster, as can occur during a or resulting from a vehicle collision. As illustrated, the knee bolster 10 can be secured to the cross beam 12 by welding, or any other known means or connection type.

The knee bolster 10 includes a curved bracket 14 which is directly mounted to the cross beam 12 and a knee panel member 16 which is directly mounted to the curved bracket 14 at a location spaced from the cross beam 12. The knee panel member 16 and the curved bracket have profiles (i.e., cross-sections) that enable both components 14, 16 to be extrudable such that, in the illustrated embodiment, the knee panel member 16 is an extrudable knee panel and the bracket 14 is an extrudable bracket. In particular, the components 14, 16 can be extruded aluminum or alternatively, any other extrudable material. The panel member 16 includes a laterally extending wall 18 which is spaced from the curved bracket 14 and a plurality of support legs 20,22,24,26 extending between the curved bracket and the laterally extending wall 18. In the illustrated embodiment, the panel member 16 includes four (4) support legs, including first outer leg 20, first inner leg 22, second outer leg 24 and second inner leg 26. The legs 20-26 are fixedly secured to the curved bracket 14.

The laterally extending wall 18 includes a generally convex wall portion 30 positioned to be opposed by one or both knees of the vehicle occupant. As shown, the convex wall portion is only slightly curved in the illustrated embodiment. The laterally extending wall 18 further includes flared ends 32,34 flanking upper and lower sides 30a,30b of the convex wall portion 30, also referred to herein as a slightly bowed wall. The flared ends 32,34 of the illustrated embodiment each have a radius of curvature that is significantly smaller than the slight curve of the convex wall portion 30. In the illustrated embodiment, the outer legs 20,24 extend from the convex wall portion 30 adjacent the flared ends 32,34 so that the convex wall portion spans across the outer legs. The inner legs 22,26 extend from the convex wall portion 30 at spaced locations from the outer legs 20,24 and from one another.

Figure 2:
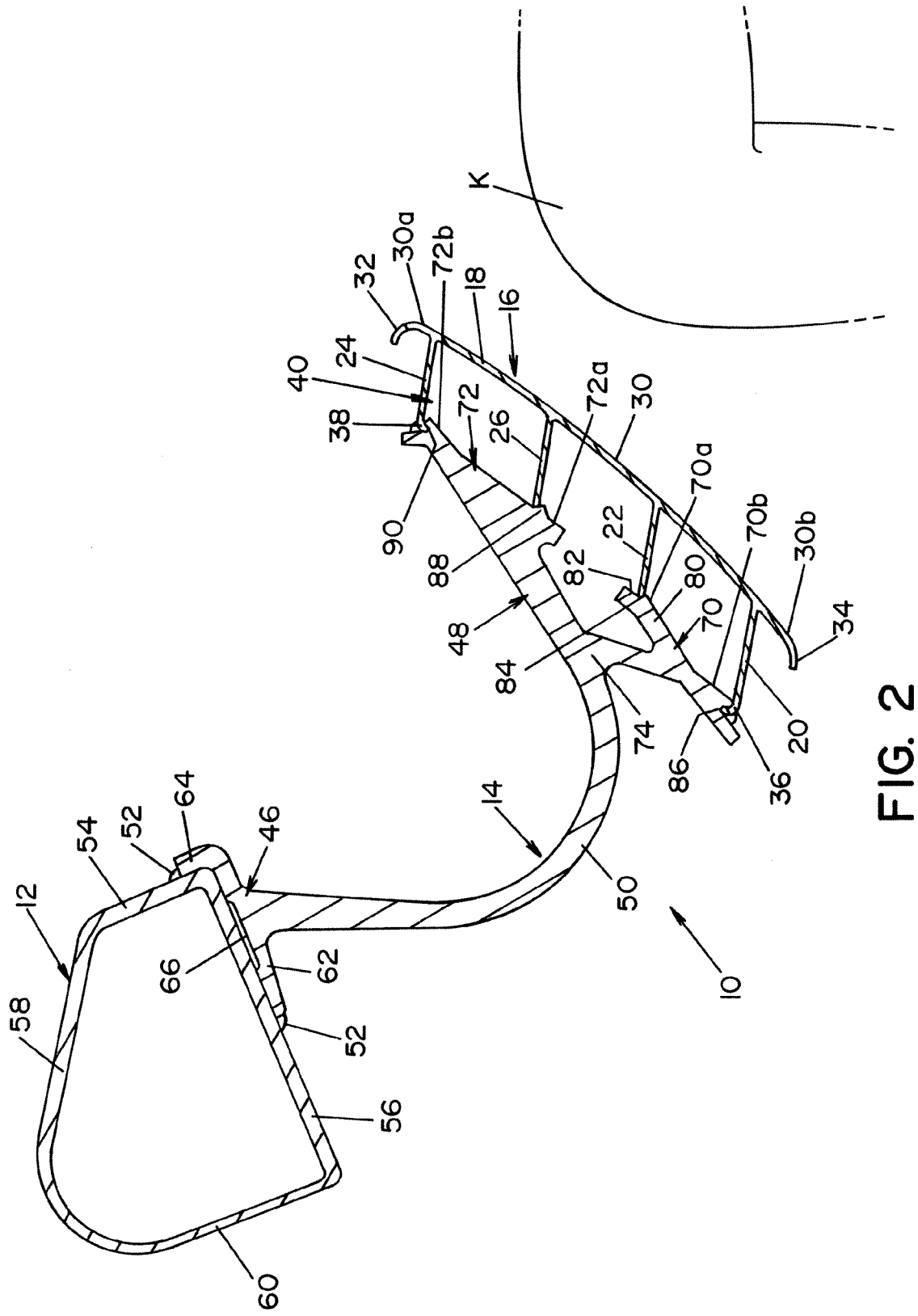
FIG. 2 is a cross-sectional view of the knee bolster of FIG. 1 showing a vehicle occupant's knee in spaced and opposed relation to the knee bolster.

With additional reference to FIG. 2, the curved bracket 14 includes a knee panel mounting portion 48 to which the knee panel member 16, and specifically the legs 20-26 of the knee panel member, are fixedly secured. The pair of outer legs 20,24 have hooked portions 36,38 disposed distally relative to the laterally extending wall 30 which, as will be described in more detail below, assist in snap-fitting the knee panel member 16 to the curved bracket 14. Together, the laterally extending wall 30, the legs 20,24 and the knee panel mounting portion 48 form a hollow frame or box section 40 which is positioned to be spaced apart from and opposed by one or both knees K of the vehicle occupant. The inner legs 22,26 extend across the frame section 40 increasing the rigidity and strength thereof.

The curved bracket 14 includes a vehicle mounting portion 46 for connecting to the cross beam 12, the knee panel mounting portion 48 to which the knee panel member 16 is mounted, and a curved positioning portion 50 extending between the vehicle mounting portion 46 and the knee panel mounting portion. The positioning portion 50 positions the knee panel member 16 at a location spaced apart and opposed by one or both knees K of the vehicle occupant, as shown in FIG. 2. The vehicle mounting portion 46 is generally L-shaped for mounting along two surfaces of the cross beam 12. In the illustrated embodiment, the mounting portion 46 is fixedly secured to the cross beam 12 via welds 52.

More particularly, in the illustrated embodiment, the cross beam 12 is a hollow beam formed by at least walls 54,56 which are approximately normal relative to one another. Additional walls 58,60 further define the illustrated cross beam 12. The L-shaped mounting portion 46 includes first mounting wall 62 for mounting along cross beam wall 56 and second mounting wall 64 for mounting along perpendicularly disposed cross beam wall 54. A recess 66 can be defined in the first mounting wall 62 adjacent the cross beam 12 for separating welds 52 securing wall 62 to the cross beam 12.

The knee panel mounting portion 48 includes at least one mounting deck, including a first mounting deck 70 and a second mounting deck 72 in the illustrated embodiment, to which the legs 20-26 are mounted. In particular, the first outer leg 20 and the first inner leg 22 are mounted to the first mounting deck 70 and the second outer leg 24 and the second inner leg 26 are mounted to the second mounting deck 72, which is spaced part from the first mounting deck 70. The mounting portion 48 includes a Y-shaped portion 74 for connecting the first and second mounting decks 70,72 to one another and to the curved positioning portion 50.

The first mounting deck 70 includes a raised section 80 against which the first inner leg 22 can be secured. More particularly, the mounting deck 70 includes a surface 70a into which a recess 82 is defined adjacent one end thereof. The leg 22 is received in the recess 82 and rests against a wall 84 partially defining the recess. The first outer leg 20 is received within a recess 86 defined in the first mounting deck 70. More particularly, the recess 86 is defined within an outer end of the mounting deck 70 adjacent a surface 70b angled slightly relative to the surface 70b. The recess 86 extends in a direction generally parallel to surface 70b and receives the hooked portion 36 of the leg 20. With the leg 22 abutting the wall 84 of the recess 82 and the leg hooked portion 36 of leg 20 received in recess 86, the knee panel member 16 is substantially prevented from moving along the deck 70.

The second mounting deck 72 includes a raised section 88 which extends outwardly from surface 72a of the deck 72. The second inner leg 26 is secured against one side of the raised section 88, which is formed as a triangular shaped section in the illustrated embodiment. The second outer leg 24 is received within a recess 90 defined in the second mounting deck 72. More particularly, the recess 90 is defined within an outer end of the mounting deck 72 adjacent a surface 72b angularly disposed relative to the surface 72a. The recess 90 extends in a direction generally parallel to surface 72b and receives the hooked portion 38 of leg 24. Together, the receipt of the leg hooked portions 36,38 in the recesses 86,90 and/or the abutment of the legs 22,26 against raised portions 80,88 limit movement of the knee panel member 16 along the decks 70,72 and relative to the curved bracket 14.

To install the knee bolster 10 in the vehicle, the knee panel member 16 and the curved bracket 14 are first sub-assembled together by snap-fitting the knee panel member to the curved bracket. More specifically, the hooked portions 36,38 of the outer legs 20,24 are inserted in respective recesses 86,90 and the inner legs 22,26 are positioned adjacent raised sections 80,88. The snap-fit connection between the knee panel member 16 and the bracket 14 maintains the subassembly 16,14 as a unitary component during installation in the vehicle. After subassembly, the knee bolster 10 can be installed into the vehicle, particularly by securing the vehicle mounting portion 46 of the bracket 14 to the cross beam 12 in any known manner, such as by welding at welds 52. Additionally, the snap-fit connection between the bracket 14 and knee panel 16 can be supplemented by welding the knee panel member 16 to the bracket 14 which further fixedly and securely connects the members 14,16 to one another. The knee bolster 10 can be used as one of a pair of knee bolsters flanking the steering column of the vehicle. As is known and understood by those skilled in the art, the knee bolster 10 can be provided beneath a plastic cover or garnish so that the knee bolster is hidden from passengers in the vehicle.

Figure 3:
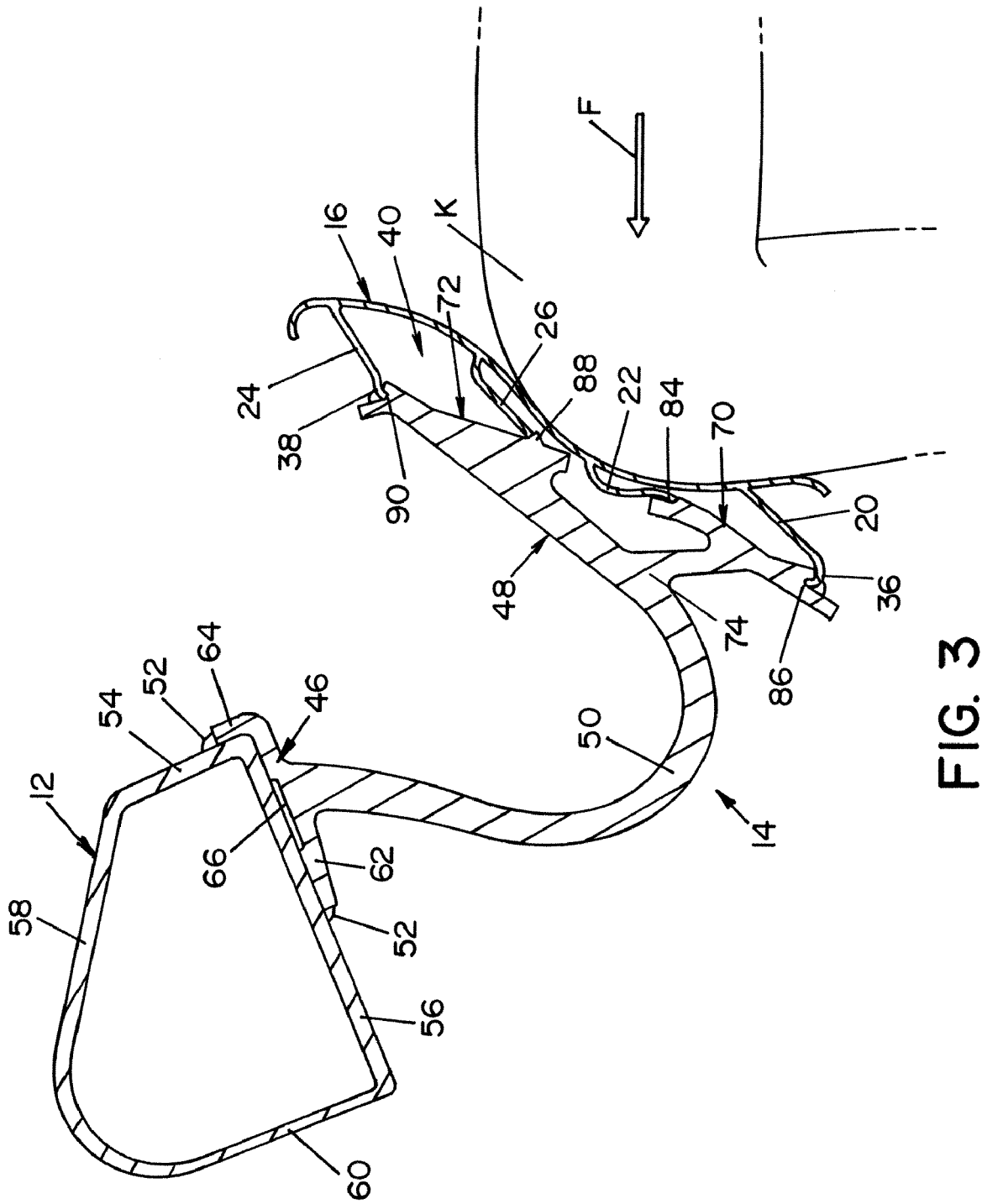
FIG. 3 is a cross-sectional view of the knee bolster of FIG. 2 showing the knee impacting into and deflecting the knee bolster.

The knee bolster 10 of the illustrated embodiment exhibits two-step displacement (or deflection) versus force behavior. More particularly, with additional reference to FIG. 3, when an impact force F is applied against the knee bolster 10, such as from knee K being forcibly driven into the knee bolster 10 during a vehicle collision, the hollow frame portion 40 generally deflects prior to the curved bracket 14 deflecting. That is, the knee panel member 16 first deflects when an increasing impact force F is applied to the knee bolster and, only after the force F exceeds a predetermined amount, does the curved bracket 14 deflect. Thus, the curved shape of the bracket 14 generally resists deflection from force F until the force exceeds a predetermined amount.

Figure 4:
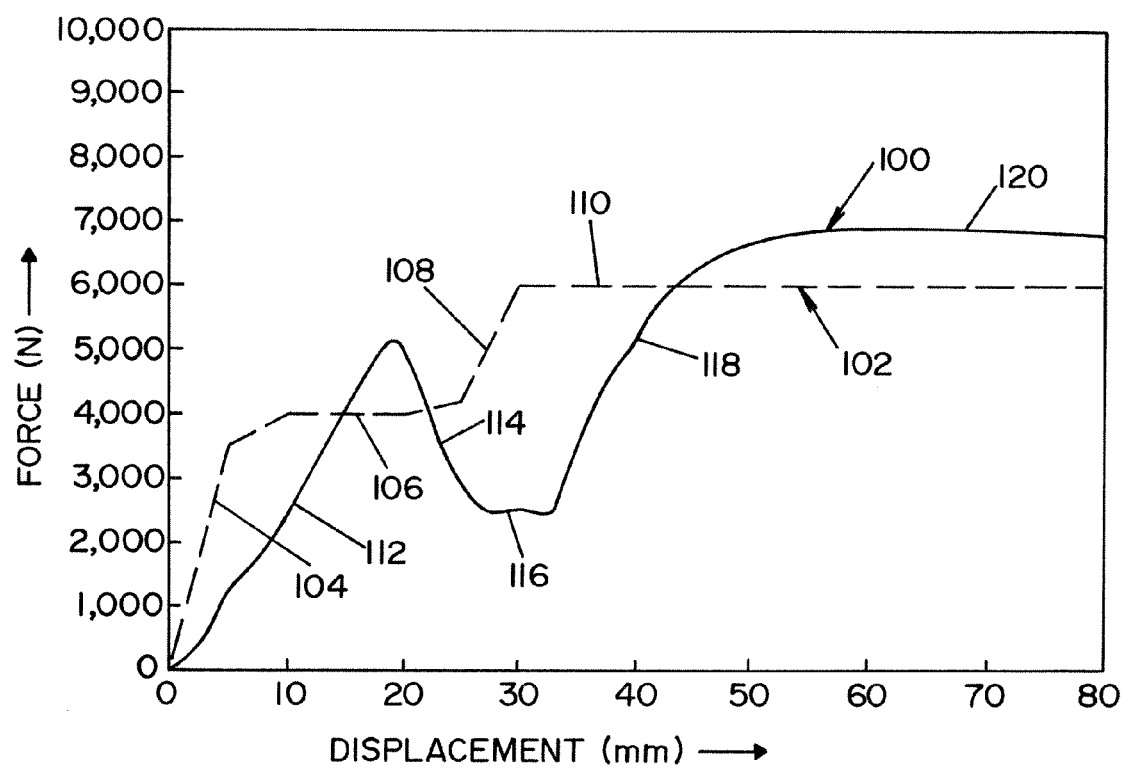
FIG. 4 is a force versus displacement graph showing the relative displacement or deflection of the knee bolster of FIG. 1 as an increasing force is applied thereto against a target curve.

With additional reference to FIG. 4, the knee bolster 10 can be designed to have a displacement versus force curve 100 that matches or at least generally follows a target displacement/deflection versus force curve, such as illustrated target curve 102. The target crush curve 60 represents one ideal deflection of a knee bolster in response to an increasing impact force applied thereto. The two-step deflection versus force curve can be used to slow the impact of a passenger and better position the passenger, particularly if not safely belted in the vehicle, prior to deployment of the airbag and impact into the steering wheel. Slowing the impact of the passenger may be desirable without exceeding a certain load, such as about 6,000 N. More particularly, the amount of deflection, represented by curve portion 104, is initially very small, e.g., from about 5 mm to about 10 mm, until the force applied exceeds about 4,000 N. Specifically, in the illustrated target curve 102, deflection is linear from about 0 mm to about 5 mm as force applied increases from about 0 N to about 3,500 N and deflection is also linear from about 5 mm to about 10 mm as force applied increases from about 3,500 N to about 4,000 N. At approximately 4,000 N, a knee bolster behaving as represented by the target curve 102 deflects a first significant amount, such as about an additional 15 mm, represented by curve portion 106. After the deflection along curve portion 106, the knee bolster following target curve 102 preferably resists significant further deflection until further force is applied thereto.

Specifically, in a knee bolster behaving according to the target crush curve 102, deflection occurs linearly for about an additional 5 mm as the force applied exceeds about 4,000 N and approaches about 6,000 N, as represented by curve portion 108. When the force applied to the knee bolster reaches or exceeds about 6,000 N, the knee bolster of the target curve 102 preferably deflects a second significant amount, such as about an amount greater than 50 mm, as represented by curve portion 110. The target curve 102 is generally a two-step deflection versus force curve, wherein a knee bolster operating as represented by curve 102 initially deflects a minimal amount as a first increasing force is applied, then deflects a first significant amount at a first predetermined force, such as about 4,000 N in the illustrated curve, then deflects a minimal amount as a second increasing force is applied, and finally deflects a second significant amount at a second predetermined force, about 6,000 N in the illustrated curve.

To design the knee bolster 10 to generally follow the target curve 102, the thickness of the convex wall portion 30 and the height of the legs 20-26 can be adjusted so that knee bolster 10 will have a slightly and/or linearly deflecting portion and a first step. Similarly, the thickness and radius of curvature of the bracket 14 can be adjusted to tune the deformation behavior of the bracket in relation to impact force F. Further tuning of the knee bolster 10 (i.e., precisely dimensioning the knee bolster so that it deflects against an applied force in a desired manner) can be done by adjusting the widths of the members 14,16, which are about 50 mm in the illustrated embodiment, together or independently. Of course, as is known and understood by those skilled in the art, the precise width of one or both components 14,16 of the knee bolster 10 can vary and may be dependent upon the desired behavior under an impact load and/or layout space in the vehicle passenger compartment. Since the members 14,16 are separate components and formed independent of one another, typically by extrusion, the tuning of each member 14,16 can be done independently of the other, thereby better enabling matching the deflection versus force behavior of the knee bolster 10 to the target curve 100, or any other desired target curve.

For example, the knee bolster 10 of the preferred embodiment can have dimensions such that the knee bolster exhibits the force versus deflection behavior of curve 100, generally following the target curve 102, in response to increasing impact force F being applied by knee K to the knee panel 30. That is, when force F is about 0 and increased to about 5,000 N, the knee bolster 10 and, specifically, the knee panel 30 deflect a first minimal amount, such as about 20 mm, represented by curve portion 112. At about 5,000 N (or even a decreasing force), the knee panel 30 deflects a first significant amount, such as about an additional 15 mm, as represented by curve portions 114 and 116. More particularly, the hollow frame section 40 deflects first when knee bolster 10 is deflecting from about 0 mm to about 35 mm as a result of knee K forcibly impacting the knee bolster 10. After the deflecting the first significant amount, the knee bolster 10 resists significant further deflection until further force F is applied thereto. In this manner, forward movement of an impacting passenger can be significantly reduced without the load applied exceeding about 6,000 N.

Curved bracket 14 deflects second (i.e., after crumpling of the frame portion 40) when knee bolster 10 further deflects beyond about 35 mm as a result of knee K continuing to forcibly impact the knee bolster 10. Specifically, the illustrated knee bolster 10 deflects about an additional 10-15 mm as force F increases to or toward about 6,000 N, as represented by curve portion 118. When the force F reaches or exceeds about 6,000 N, the knee bolster 10 deflects a second significant amount, such as an amount greater than 50 mm, as represented by curve portion 120. Thus, the deflection curve 100 of the knee bolster 10 generally follows the two-step path of target curve 102, including only deforming a first significant amount when the first predetermined force is applied to the knee bolster 10 and only deforming a second significant amount when the second predetermined force is applied to the knee bolster.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A knee bolster for mounting within a vehicle, the knee bolster comprising:
   a curved bracket mounted to an associated cross beam of the vehicle;
   a knee panel member mounted to said curved bracket at a location spaced from said associated cross beam, said panel member including a laterally extending wall spaced from said curved bracket and support legs extending between said laterally extending wall and said curved bracket, wherein said knee panel member deflects by said support legs collapsing upon receipt of an increasing impact force that is below a predetermined amount and subsequently said curved bracket deflects after said increasing impact force exceeds said predetermined amount such that said knee bolster exhibits two-step displacement versus force behavior.

2. The knee bolster of claim 1 wherein said laterally extending wall includes a generally convex wall portion positioned to be opposed by one or both knees of an occupant in the vehicle.

3. The knee bolster of claim 2 wherein said laterally extending wall includes flared ends flanking upper and lower sides of said convex wall portion.

4. The knee bolster of claim 3 wherein said convex wall portion is only gradually curved and said flared ends have a radius of curvature smaller than said convex wall portion.

5. The knee bolster of claim 4 wherein said support legs include outer legs extending from said convex wall portion adjacent said flared ends so that said convex wall portion spans across said outer legs.

6. The knee bolster of claim 5 wherein said support legs further include inner legs extending from said convex wall portion at spaced locations from said outer legs and from one another.

7. The knee bolster of claim 1 wherein said support legs are fixedly secured to said curved bracket by at least one of a snap-fit connection and welding.

8. The knee bolster of claim 1 wherein said bracket includes a knee panel mounting portion to which the knee panel member is fixedly secured.

9. The knee bolster of claim 8 wherein said laterally extending wall, said legs and said knee panel mounting portion form a hollow frame section positioned to be spaced apart from and opposed by one or both knees of a vehicle occupant.

10. The knee bolster of claim 1 wherein said legs include a pair of outer legs having hooked portions disposed distally relative to said laterally extending wall for snap-fitting to said curved bracket.

11. The knee bolster of claim 1 wherein said curved bracket includes a vehicle mounting portion for connecting to said associated cross beam, a knee panel mounting portion for having said knee panel member mounted thereto, and a curved positioning portion extending between said vehicle mounting portion and said knee panel mounting portion for positioning said knee panel member at a location spaced apart from and opposed by one or both knees of a vehicle occupant.

12. The knee bolster of claim 11 wherein said vehicle mounting portion is generally L-shaped for mounting along two surfaces of said associated cross member via welding.

13. The knee bolster of claim 11 wherein said knee panel mounting portion includes at least one mounting deck to which said legs are mounted.

14. The knee bolster of claim 13 wherein said at least one mounting deck includes a first mounting deck to which a first inner and a first outer of said legs are mounted and a second mounting deck to which said second inner and said second outer of said legs are mounted, the first mounting deck spaced apart from the second mounting deck.

15. The knee bolster of claim 14 wherein the first mounting deck includes a raised section against which said first inner leg is secured and the second mounting deck includes a raised section against which said second inner leg is secured.

16. The knee bolster of claim 14 wherein said first mounting deck includes a recess for receiving an end of said first outer leg and said second mounting deck includes another recess for receiving an end of said second outer leg.

17. A knee bolster for mounting within a vehicle, the knee bolster comprising:
a curved bracket mounted to an associated cross beam of the vehicle;
a knee panel member mounted to said curved bracket at a location spaced from said associated cross beam, said panel member including a laterally extending wall spaced from said curved bracket and support legs extending between said laterally extending wall and said curved bracket,
wherein said curved bracket includes a vehicle mounting portion for connecting to said associated cross beam, a knee panel mounting portion for having said knee panel member mounted thereto, and a curved positioning portion extending between said vehicle mounting portion and said knee panel mounting portion for positioning said knee panel member at a location spaced apart from and opposed by one or both knees of a vehicle occupant;
said knee panel mounting portion includes at least one mounting deck to which said legs are mounted and said at least one mounting deck includes a first mounting deck to which a first inner and a first outer of said legs are mounted and a second mounting deck to which said second inner and said second outer of said legs are mounted, the first mounting deck spaced apart from the second mounting deck;
wherein a Y-shaped portion of said curved bracket connects said first and second mounting decks to said curved positioning portion.

18. The knee bolster of claim 17 wherein an increasing impact force from an occupant's knee first deflects said knee panel member and then substantially deflects said curved bracket such that said knee bolster exhibits two-step displacement versus force behavior.

19. A knee bolster for mounting within a vehicle, the knee bolster comprising:
a curved bracket mounted to an associated cross beam of the vehicle;
a knee panel member mounted to said curved bracket at a location spaced from said associated cross beam, said panel member including a laterally extending wall spaced from said curved bracket and support legs extending between said laterally extending wall and said curved bracket, wherein said knee panel member deflects upon application of an increasing impact force including when said increasing impact force is below a predetermined amount, and said curved bracket deflects only after said increasing impact force exceeds said predetermined amount.

20. A vehicle knee bolster, comprising:
a cross member extending laterally along a vehicle;
a knee panel mounted to said cross member and positioned to be spaced apart from and opposed to one or both knees of a vehicle occupant;
a bracket mounts said knee panel to said cross member in spaced relation thereto, said bracket having a curved shape that extends from said cross member to said knee panel, said knee panel deflecting a first amount upon application of an impact force below a predetermined amount without deflection of said bracket.

21. The vehicle knee bolster of claim 20 wherein said knee panel includes a laterally extending wall spaced from said bracket and a plurality of support legs extending between said laterally extending wall and said bracket to form a hollow frame section, said bracket resisting deflection until said impact force exceeds said predetermined amount.

22. The vehicle knee bolster of claim 20 wherein said knee panel is an extrudable knee panel and said bracket is an extrudable bracket.

23. A vehicle knee bolster, comprising:
a bracket mounted to an associated cross beam of a vehicle and extending therefrom to a spaced apart location, said bracket having a curved shape along a portion that extends from the associated cross beam to said spaced apart location;
a knee panel member mounted to an end of said bracket opposite said associated cross beam at said spaced apart location, said end having at least one mounting deck to which legs of said knee panel member are secured for supporting a laterally extending wall at a spaced location from said at least one mounting deck, said at least one mounting deck, said legs and said laterally extending wall together forming a hollow frame section for deflecting a first amount of displacement upon receipt of an increasing impact load, said bracket deflecting a second amount of displacement after said hollow frame section deflects said first amount and when said increasing impact load is in excess of a predetermined amount.

24. The vehicle knee bolster of claim 23 wherein said at least one mounting deck is a first mounting deck to which first inner and outer legs of said knee panel member are secured and a second mounting deck to which second inner and outer legs of said knee panel member are secured, said first and second mounting decks spaced apart from one another and connected to the associated cross beam by a Y-shaped portion of said bracket.

* * * * *